(12) United States Patent
Tada (10) Patent No.: US 7,295,246 B2
(45) Date of Patent: Nov. 13, 2007

(54) PICTURE SIGNAL PROCESSING CIRCUIT

(75) Inventor: Toshiki Tada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 517 days.

(21) Appl. No.: 10/890,259

(22) Filed: Jul. 14, 2004

(65) Prior Publication Data
US 2005/0024533 A1   Feb. 3, 2005

(30) Foreign Application Priority Data
Jul. 31, 2003   (JP)   ............... 2003-284064

(51) Int. Cl.
*H04N 7/01*   (2006.01)
*H04N 11/20*   (2006.01)
(52) U.S. Cl. .............. 348/458; 348/448; 348/584
(58) Field of Classification Search .......... 348/448, 348/452, 458, 584, 554, 441, 714, 716
See application file for complete search history.

(56) References Cited

U.S. PATENT DOCUMENTS

| | | | | |
|---|---|---|---|---|
| 4,835,612 | A * | 5/1989 | Ohishi | 348/716 |
| 4,872,054 | A * | 10/1989 | Gray et al. | 348/441 |
| 5,347,322 | A * | 9/1994 | Levine et al. | 348/718 |
| 5,631,713 | A * | 5/1997 | Hoshino | 348/716 |
| 5,940,141 | A | 8/1999 | Faroudja et al. | |
| 5,982,425 | A * | 11/1999 | Allen et al. | 348/231.9 |
| 6,327,000 | B1 * | 12/2001 | Auld et al. | 348/441 |
| 6,462,786 | B1 * | 10/2002 | Glen et al. | 348/599 |
| 6,580,461 | B2 * | 6/2003 | Chambers et al. | 348/458 |
| 6,798,420 | B1 * | 9/2004 | Xie | 345/554 |

FOREIGN PATENT DOCUMENTS

| | | |
|---|---|---|
| JP | 06-199500 | 8/1993 |
| JP | 2001-54073 | 2/2001 |
| JP | 2002-369191 A | 12/2002 |

OTHER PUBLICATIONS

Japanese Office Action dated Jul. 31, 2007 (with English Translation).

* cited by examiner

*Primary Examiner*—Victor R. Kostak
(74) *Attorney, Agent, or Firm*—McDermott Will & Emery LLP (57) ABSTRACT

In a picture signal processing circuit, in the case of converting picture signal data compliant with an analog video standard to a digital video format to obtain progressive data of a digital value, in a line which is included in a picture display period (active period=486 lines) of a digital progressive standard (e.g., the 40th to 525th lines in the second field) and which corresponds to a video display blank period of an analog progressive standard (e.g., the 40th to 42nd lines in the second field), the data is interpolated with data which is the same as the data obtained immediately after the start of a picture display period of the analog progressive standard (data of the 43rd line). Thus, even if there is a difference between a picture display period of the analog progressive standard and a picture display period of the digital progressive standard, the picture signal processing circuit outputs video data compliant with the digital progressive standard which is effective throughout the picture display period.

14 Claims, 8 Drawing Sheets

DIGITAL 525P STANDARD

FIG. 2B

DIGITAL 625P STANDARD

# PICTURE SIGNAL PROCESSING CIRCUIT

BACKGROUND OF THE INVENTION

The present invention relates to a picture signal processing circuit which performs an image interpolation process for outputting pictures.

A conventional picture signal processing circuit wherein picture signal data compliant with analog video standards is used to carry out a digital format conversion compliant with digital standards for producing digital output is described in, for example, Japanese Unexamined Patent Publication No. 2002-369191. The structure of this picture signal processing circuit is shown in FIG. 6.

Figure 6:
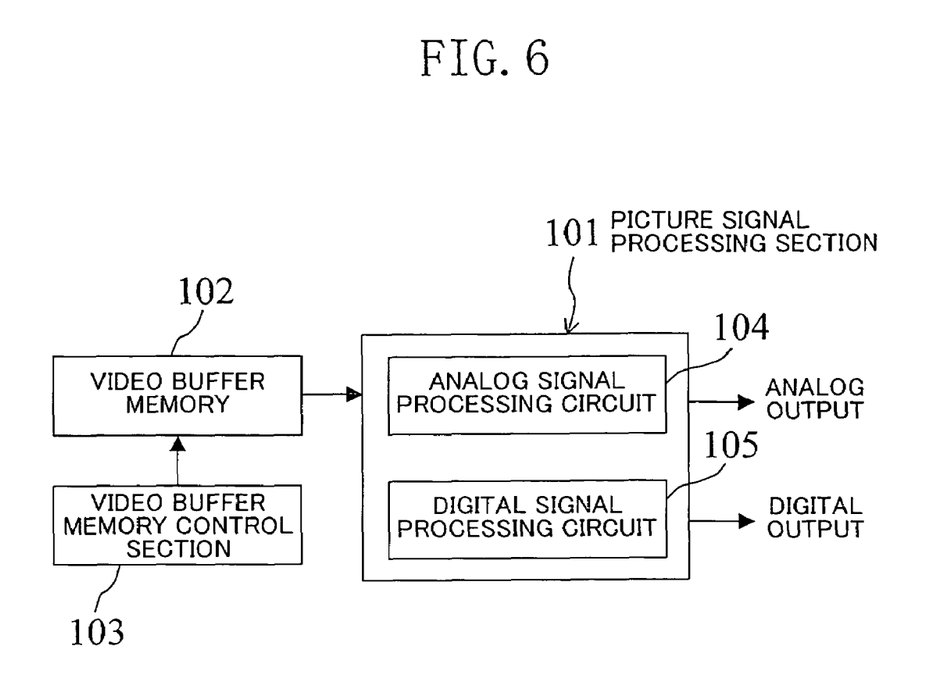
FIG. 6 shows a structure of a conventional picture signal processing circuit.

The picture signal processing circuit shown in FIG. 6 includes a video buffer memory 102, a video buffer memory control section 103, and a picture signal processing section 101 which includes an analog signal processing circuit 104 and a digital signal processing circuit 105. The video buffer memory 102 stores image data which has been decoded and converted to analog progressive data. The video buffer memory control section 103 performs output control of the data stored in the video buffer memory 102 based on the output format and an analog data effective line signal. The analog signal processing circuit 104 converts picture signal data compliant with the analog video standards, which is input from the video buffer memory 102, to an analog format, thereby performing signal processing for an analog output. The digital signal processing circuit 105 converts picture signal data compliant with the analog video standards, which is input from the video buffer memory 102, to a digital format, thereby performing signal processing for a digital output. Such a circuit which is capable of both analogly and digitally outputting picture signal data is disclosed in the above-mentioned publication, for example.

However, in the above-described conventional structure, picture signal data compliant with the progressive analog video standards is subjected to a digital format conversion to produce a digital output. Thus, video data cannot be output unceasingly during a picture display period that is defined in the progressive digital video standards. As a result, there is no picture signal data even in the video signal display period, and black data is output instead. This is caused by a difference in the image display period (active period) between the analog video standard shown in FIG. 7 (see Rec.ITU-R BT1358 "STUDIO PARAMETERS OF 625 AND 525 LINE PROGRESSIVE SCAN TELEVISION SYSTEMS") and the digital video standard shown in FIG. 8 (see Rec.ITU-R BT1362 "INTERFACES FOR DIGITAL COMPONENT VIDEO SIGNALS IN 525- AND 625-LINE PROGRESSIVE SCAN TELEVISION SYSTEMS").

Figure 7:
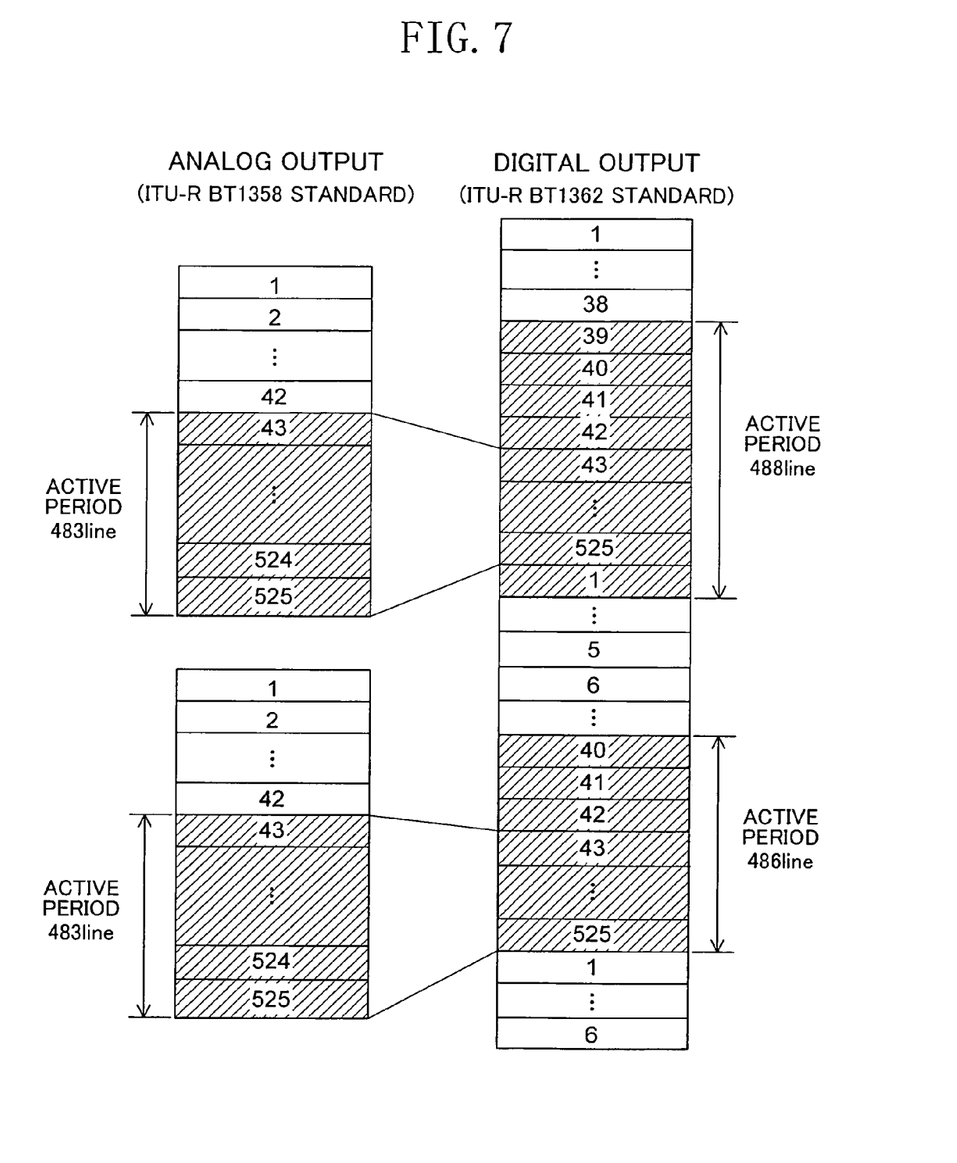
FIG. 7 shows video display lines of the 525P (480P) analog video standard ITU-R BT1358 and the digital video standard ITU-R BT1362.
Figure 8:
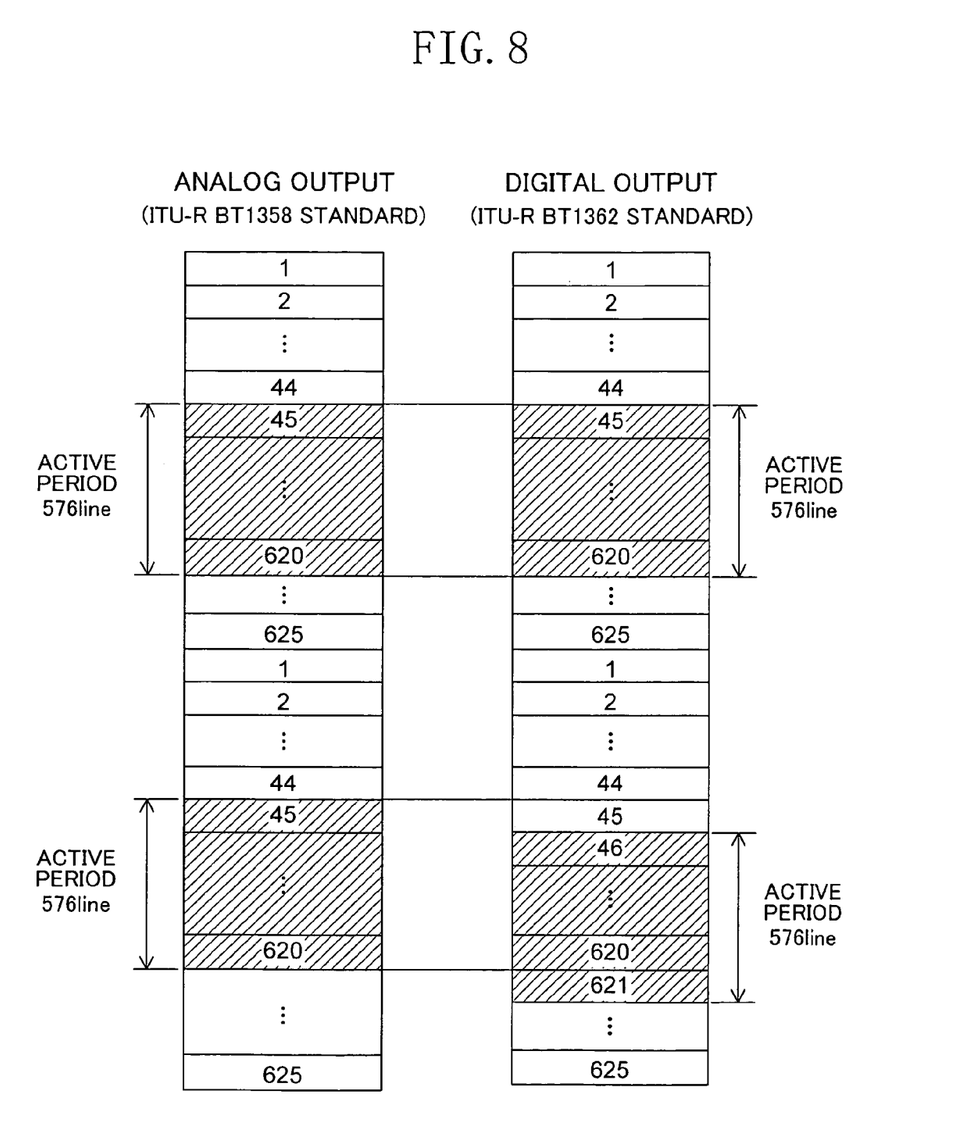
FIG. 8 shows video display lines of the 625P (576P) analog video standard ITU-R BT1358 and the digital video standard ITU-R BT1362.

Among the analog video standards, in the NTSC progressive standard (analog 525P standard) shown in FIG. 7, all of the fields are normalized with the 43rd to 525th lines during the video signal display period. On the other hand, in the NTSC progressive standard of the digital video standards (digital 525P standard) shown in FIG. 7, the odd-numbered fields are normalized with the 39th line to the 1st line of the next field, and the even-numbered fields are normalized with the 40th to 525th lines. In the PAL progressive standard of the analog video standards (analog 625P standard), all of the fields are normalized with the 45th to 620th lines during the video signal display period as shown in FIG. 8. On the other hand, in the PAL progressive standard of the digital video standards (digital 625P standard), the odd-numbered fields are normalized with the 45th to 620th line, and the even-numbered fields are normalized with the 46th to 621st lines.

Therefore, when conventional video data compliant with the analog video standards is subjected to digital format conversion, in the case of the digital 525P standard, image data for the 39th to 42nd lines and the final line, i.e., 5 lines in total, do not exist in the odd-numbered fields, and image data for the 40th to 42nd lines, i.e., 3 lines in total, do not exist in the even-numbered fields. As a result, in the period where these image data do not exist, black data is output as in other blanking periods (video blank periods). This is the same to the digital 625P standard, wherein the odd-numbered fields are identical, but the 621st line of the even-numbered field lacks data. Therefore, black data is output although it is a picture display period.

Thus, in the conventional techniques, the digital output compliant with the digital video standards cannot be produced.

SUMMARY OF THE INVENTION

An objective of the present invention is to provide a picture signal processing circuit wherein in the case where picture signal data compliant with the analog video standards is converted to a digital format compliant with the digital standards to produce a digital output, a difference in the picture display period between the analog video standards and the digital video standards is removed, and an effective video signal is output without interruption during the picture display period compliant with the digital video standards.

In order to achieve the above objective, the output of picture signal data compliant with the analog video standards from a video buffer memory is controlled using the concept of the picture display period of the digital video standards, whereby picture signal data compliant with the analog video standards which is to be subjected to a digital signal process is appropriately interpolated to obtain a digital progressive signal compliant with the digital video standards.

A picture signal processing circuit of the present invention comprises: a video buffer memory for storing picture signal data compliant with an analog video signal standard; an analog signal processing section for converting the picture signal data compliant with the analog video signal standard, which is output from the video buffer memory, to an analog video format, thereby obtaining progressive data of an analog value; a digital signal processing section for converting the picture signal data compliant with the analog video signal standard, which is output from the video buffer memory, to an digital video format, thereby obtaining progressive data of a digital value; and a video buffer memory control section for controlling the output of the picture signal data compliant with the analog video signal standard from the video buffer memory such that the picture signal data compliant with the analog video signal standard from the video buffer memory is interpolated according to the type of a digital video format in the digital signal processing section.

In the picture signal processing circuit of the present invention, the analog signal processing section generates an analog picture display period signal while the digital signal processing section generates a digital picture display period signal; and the video buffer memory control section controls the output of the picture signal data compliant with the analog video signal standard from the video buffer memory by hardware according to the analog picture display period signal from the analog signal processing section and the digital picture display period signal from the digital signal processing section.

In the picture signal processing circuit of the present invention, the video buffer memory control section controls the output of the picture signal data compliant with the analog video signal standard from the video buffer memory by software according to a currently processed line of digital picture signal data in the digital signal processing section, the digital video format in the digital signal processing section, and the analog video format in the analog signal processing section.

In the picture signal processing circuit of the present invention, if the picture signal data compliant with the analog video signal standard which is output from the video buffer memory is within a video display blank period on the analog video format of the analog signal processing section but is within a picture display period on the digital video format of the digital signal processing section, the video buffer memory control section interpolates data in the picture display period on the digital video format using data which is the same as picture signal data compliant with an analog video signal standard which is stored in the video buffer memory.

In the picture signal processing circuit of the present invention, the video buffer memory control section interpolates data in the picture display period on the digital video format using data which is the same as a portion of the picture signal data compliant with the analog video signal standard which is stored in the video buffer memory, the portion of the picture signal data being obtained immediately after the start of the picture display period on the analog video format.

In the picture signal processing circuit of the present invention, the video buffer memory control section interpolates data in the picture display period on the digital video format using data which is the same as a portion of the picture signal data compliant with the analog video signal standard which is stored in the video buffer memory, the portion of the picture signal data being obtained immediately before the start of the video display blank period on the analog video format.

In the picture signal processing circuit of the present invention, if a picture display period on the digital video format is not identical with a video display blank period on the analog video format such that the picture display period is displaced to the upper side of the picture signal data compliant with the analog video signal standard, the video buffer memory control section shifts picture signal data compliant with the analog video signal standard in the video buffer memory toward the upper side by a predetermined number of lines and interpolates data in the picture display period on the digital video format uniformly among the upper side and the lower side of the data using the upwardly-shifted picture signal data compliant with the analog video signal standard.

In the picture signal processing circuit of the present invention, the video buffer memory control section interpolates data in the picture display period on the digital video format using a portion of the picture signal data compliant with the analog video signal standard which has been shifted toward the upper side in the video buffer memory, the portion being the same as picture signal data compliant with the analog video signal standard which is obtained immediately after the start of a picture display period on the analog video format.

In the picture signal processing circuit of the present invention, the video buffer memory control section interpolates data in the picture display period on the digital video format using a portion of the picture signal data compliant with the analog video signal standard which has been shifted toward the upper side in the video buffer memory, the portion being the same as picture signal data compliant with the analog video signal standard which is obtained immediately before the start of a video display blank period on the analog video format.

In the picture signal processing circuit of the present invention, the analog signal processing section receives picture signal data compliant with the analog video signal standard which has been output from the video buffer memory and interpolated by the video buffer memory control section; and the analog signal processing section has an output adjustment function of masking the received picture signal data compliant with the analog video signal standard during a video display blank period on the analog video format.

In the picture signal processing circuit of the present invention, the analog signal processing section receives picture signal data compliant with the analog video signal standard which has been output from the video buffer memory but not interpolated by the video buffer memory control section; and the digital signal processing section receives picture signal data compliant with the analog video signal standard which has been output from the video buffer memory and interpolated by the video buffer memory control section.

In the picture signal processing circuit of the present invention, the video buffer memory control section controls output of data from the video buffer memory such that a portion of the interpolated picture signal data compliant with the analog video signal standard which corresponds to a plurality of predetermined lines is simultaneously output; the picture signal processing circuit further comprises a transfer function operation circuit; and the transfer function operation circuit receives the portion of the picture signal data compliant with the analog video signal standard which corresponds to the plurality of lines and is output from the video buffer memory, and performs a predetermined interpolation operation on the portion of the picture signal data compliant with the analog video signal standard which corresponds to the plurality of lines, the picture signal data compliant with the analog video signal standard which has undergone the interpolation operation being output to the digital signal processing section.

In the picture signal processing circuit of the present invention, the video buffer memory control section simultaneously outputs a portion of the picture signal data compliant with the analog video signal standard in the video buffer memory which corresponds to a plurality of predetermined lines immediately after the start of a picture display period on the analog video format.

In the picture signal processing circuit of the present invention, the video buffer memory control section simultaneously outputs a portion of the picture signal data compliant with the analog video signal standard in the video buffer memory which corresponds to a plurality of predetermined lines immediately before the start of a video display blank period on the analog video format.

As described above, according to the present invention, when converting picture signal data compliant with an analog video signal standard to a digital video format in the digital signal processing section to obtain progressive data of a digital value, the video buffer memory control section controls output of the picture signal data compliant with the analog video signal standard from the video buffer memory and interpolates the picture signal data compliant with the analog video signal standard from the video buffer memory so as to satisfactorily comply with the digital video format used in the signal processing section. For example, in the NTSC progressive standard of the digital video standards, the odd-numbered field includes 488 display lines in one screen frame, and the even-numbered field includes 486 display lines in one screen frame. Thus, in the odd-numbered field, 5 lines are interpolated into the 483 lines which is the maximum of the conventional system such that display of pictures of 488 lines is produced as per the standard. In the even-numbered field, 3 lines are interpolated into the 483 lines which is the maximum of the conventional system such that display of pictures of 486 lines is produced as per the standard. Likewise, in a PAL progressive standard of the digital video standards, the number of display lines in one screen frame is 576 lines in both the odd-numbered field and the even-numbered field. In the even-numbered field, 1 line is interpolated into the conventionally-employed 575 lines such that display of pictures of 576 lines is produced as per the standard.

DESCRIPTION OF THE PREFERRED EMBODIMENTS

Hereinafter, preferred embodiments of the present invention are described with reference to the attached drawings.

Embodiment 1

Figure 1:
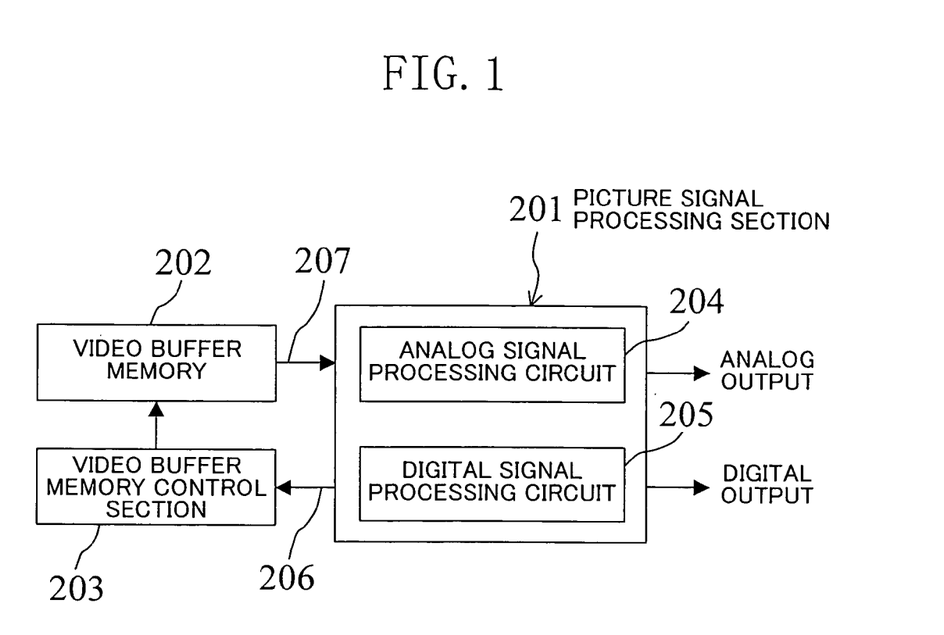
FIG. 1 is a block diagram showing a structure of a picture signal processing circuit according to embodiment 1 of the present invention.

FIG. 1 shows a structure of a picture signal processing circuit according to embodiment 1 of the present invention.

In FIG. 1, reference numeral 201 denotes a picture signal processing section. Reference numeral 202 denotes a video buffer memory for storing picture signal data compliant with the analog video standards (analog video signal standards) which is a digital value obtained by A/D converting picture signal data read from a content (hereinafter, referred to as "picture signal data compliant with the analog video standards"). Reference numeral 203 denotes a video buffer memory control section. The picture signal processing section 201 includes an analog signal processing circuit (analog signal processing section) 204 and a digital signal processing circuit (digital signal processing section) 205.

Reference numeral 206 denotes a video buffer memory control signal for controlling the video buffer memory 202, which is output from the digital signal processing circuit 205. In embodiment 1, the video buffer memory control signal 206 is a digital progressive picture display period signal (digital picture display period signal) compliant with the digital video standards which is generated in the digital signal processing circuit 205. The digital progressive picture display period signal 206 is a signal in a digital video format which indicates picture display periods (active periods) as shown in FIG. 7 and FIG. 8. The picture display period signal shown in FIG. 7 is a picture display period signal compliant with the NTSC progressive standard, which corresponds to 488 lines from the 39th line to the first line of the next field in the odd-numbered field and 486 lines from the 40th to 525th lines in the even-numbered field. The picture display period signal shown in FIG. 8 is a picture display period signal compliant with the PAL progressive standard, which corresponds to 576 lines from the 45th to 620th lines in the odd-numbered field and 576 lines from the 46th to 621st lines in the even-numbered field.

In FIG. 1, progressive image data which has undergone the decoding process is output from the video buffer memory 202 as picture signal data 207 compliant with the analog video standards. The picture signal data 207 compliant with the analog video standards is input to the analog signal processing circuit 204 and the digital signal processing circuit 205 of the picture signal processing section 201.

The video buffer memory control section 203 of FIG. 1 receives the video buffer memory control signal (digital progressive picture display period signal) 206 from the digital signal processing circuit 205. In the case where the video buffer memory 202 outputs picture signal data compliant with the analog video standards, the video buffer memory control section 203 controls output of the picture signal data 207 compliant with the analog video standards from the video buffer memory 202 according to whether the digital video format in the digital signal processing circuit 205 is compliant with the NTSC progressive standard or the PAL progressive standard such that the picture signal data compliant with the analog video standards is interpolated as effective data.

Figure 2A:
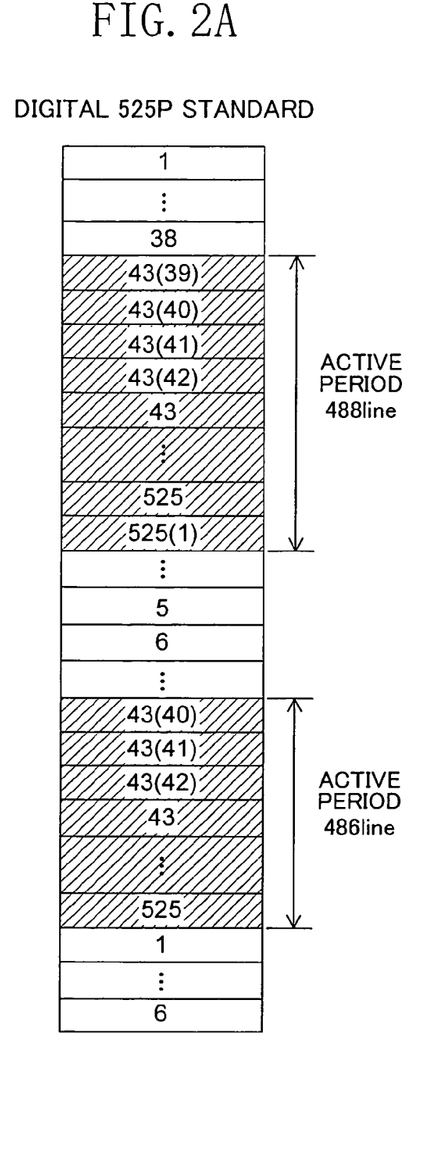
FIG. 2A shows NTSC progressive data which is converted to a digital value based on interpolated picture signal data compliant with the analog video standards in the picture signal processing circuit of embodiment 1.

Hereinafter, interpolation of the picture signal data compliant with the analog video standards is described with a specific example. In the case where the digital video format of the digital signal processing circuit 205 is based on a NTSC digital progressive standard (digital 525P standard) as shown in FIG. 2A, the picture signal data 207 input to the digital signal processing circuit 205 is such that the data of the 39th to 42nd lines of the first field are within the active period. However, in the case of a NTSC analog progressive standard (analog 525P standard), the data of the 39th to 42nd lines are in the non-active period (video display blank period) as seen from FIG. 7. In view of such, in the picture signal data 207 compliant with the analog video standards which is output from the video buffer memory 202, the data of the 39th to 42nd lines are interpolated with the data of the 43rd line (which is the same as the data of the picture signal data 207 compliant with the analog video standards which is obtained immediately after the start of the active period in the analog 525P standard shown in FIG. 7). Since the 1st line of the next field is also in the non-active period in the case of the analog 525P standard, the data of the 1st line is interpolated with the data of the 525th line (which is the same as the data of the picture signal data 207 compliant with the analog video standards which is obtained immediately before the start of the non-active period in the digital 525P standard). In FIG. 2A, the parenthesized line numbers are actual line numbers, and the numbers shown at the left-hand side of the parenthesized line numbers are the line numbers in actual digital output data. For example, the indication of "43(39)" in the first field in the 525P (480P) standard means that although it is the 39th line in the digital 525P standard, the image data of the 43rd line is output because of the interpolation process of embodiment 1. In the second field, the data of the 40th to 42nd lines are interpolated with the data which is the same as the data of the 43rd line.

Figure 2B:
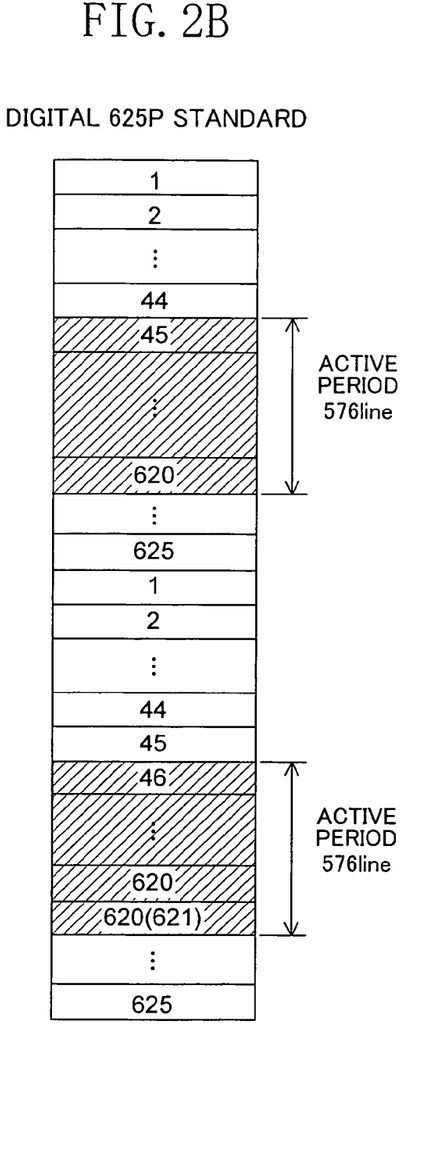
FIG. 2B shows PAL progressive data which is converted to a digital value based on interpolated picture signal data compliant with the analog video standards in the picture signal processing circuit of embodiment 1.

In the case of the PAL digital progressive standard (digital 625P standard), the data input to the digital signal processing circuit 205 is the effective data of the 45th to 620th lines in the first frame. However, in the case of the PAL analog progressive standard (analog 625P standard), the data of the 621st line in the second field is within the non-active period. Thus, the data interpolated with the data of the 620th line (which is the same as the data obtained immediately before the non-active period in the analog 625P standard) is output.

With such an interpolation process, picture signal data which is effective throughout the active period defined by the digital progressive standards is obtained from the picture signal data 207 compliant with the analog video standards which is output from the video buffer memory 202.

Interpolation control in the video buffer memory control section 203, i.e., output control of the picture signal data 207 compliant with the analog video standards from the video buffer memory 202 is performed by hardware based on the analog picture display period signal (active period signal) which is generated by the analog signal processing circuit 204 according to the analog video format and the digital picture display period signal 206 output from the digital signal processing circuit 205.

As described above, the analog signal processing circuit 204 has the output adjustment function. Specifically, in the case where interpolation control is performed on the picture signal data compliant with the analog video standards which is output from the video buffer memory 202, the analog signal processing circuit 204 receives interpolated picture signal data 207 from the video buffer memory 202 and masks the picture signal data 207 during a period corresponding to the video display blank period signal (non-active period signal) which is based on the analog video format of the picture signal data 207. The digital signal processing circuit 205 receives the interpolated picture signal data 207 and converts it to a digital video format to obtain progressive data of a digital value. In the case where only the analog signal processing circuit 204 operates, uninterpolated picture signal data compliant with the analog video standards is input from the video buffer memory 202 to the analog signal processing circuit 204, whereby the structure of the analog signal processing circuit 204 is simplified.

Embodiment 2

Figure 3A:
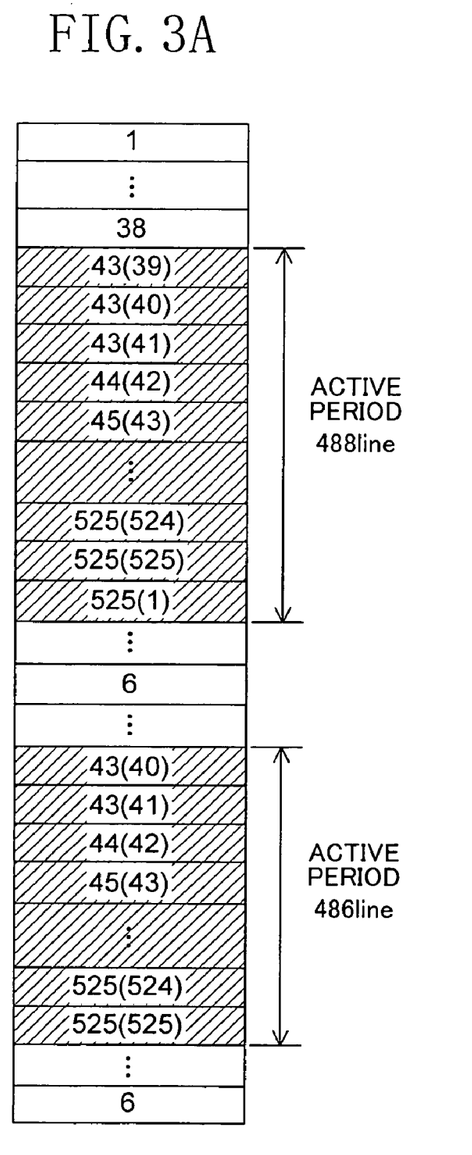
FIG. 3A shows NTSC progressive data which is converted to a digital value based on interpolated picture signal data compliant with the analog video standards in a picture signal processing circuit of embodiment 2.
Figure 3B:
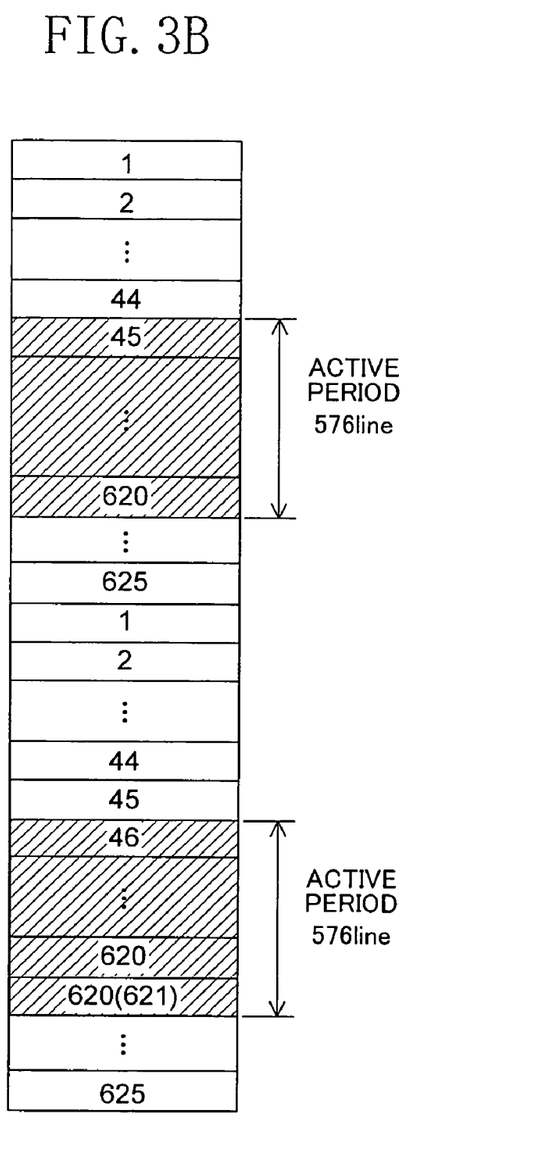
FIG. 3B shows PAL progressive data which is converted to a digital value based on interpolated picture signal data compliant with the analog video standards in the picture signal processing circuit of embodiment 2.

Next, embodiment 2 of the present invention is described.
FIG. 3 shows embodiment 2 of the present invention. The structure of a picture signal processing circuit of FIG. 3 is the same as that of the picture signal processing circuit of FIG. 1, and therefore, descriptions thereof are herein omitted.

In embodiment 1, the data of the 39th to 42nd lines are interpolated with the data obtained immediately after the start of an active period (data of the 43rd line) in the analog 525P standard as shown in FIG. 2A. In embodiment 2, picture signal data compliant with the analog 525P standard is shifted by a predetermined number of lines (e.g., 1 line) toward the upper side. As shown in FIG. 3A, the data of the 39th to 41st lines are interpolated with the data obtained immediately after the start of the active period (the data of the 43rd line) in the analog 525P standard. The data of the 42nd to 523rd lines are interpolated with the data of the 44th to 525th lines in the analog 525P standard. The data of the 524th and 525th lines and the 1st line of the next field are interpolated with the data of the 525th line in the analog 525P standard. The two sets of data, the upper side data of the 39th to 41st lines (3 lines in total) and the lower side data of the 524th to 1st lines (3 lines in total), are interpolated with the data obtained immediately after the start of the active period (data of the 43rd line) of the analog 525P standard and the data obtained immediately before the end of the active period (data of the 525th line) of the analog 525P standard, respectively.

Thus, in embodiment 2, digital progressive data is obtained, with which images of higher quality is produced.

Embodiment 3

Figure 4:
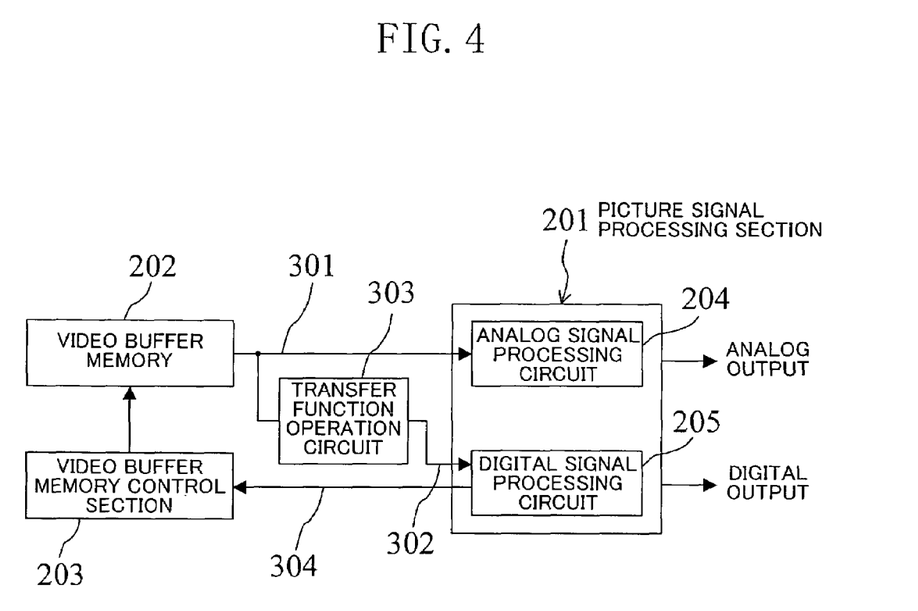
FIG. 4 is a block diagram showing a structure of a picture signal processing circuit according to embodiment 3 of the present invention.

Next, embodiment 3 of the present invention is described.
FIG. 4 shows a picture signal processing circuit according to embodiment 3 of the present invention. In the picture signal processing circuit of FIG. 4, a part of the function of the video buffer memory control section 203 is modified, and a transfer function operation section 303 is further provided.

In FIG. 4, a digital signal processing circuit 205 outputs a digital line counter signal 304. The video buffer memory control section 203 receives the digital line counter signal 304. The line counter signal 304 indicates a currently-processed line in a vertical line counter (not shown) incorporated in the digital signal processing circuit 205.

Figure 5A:
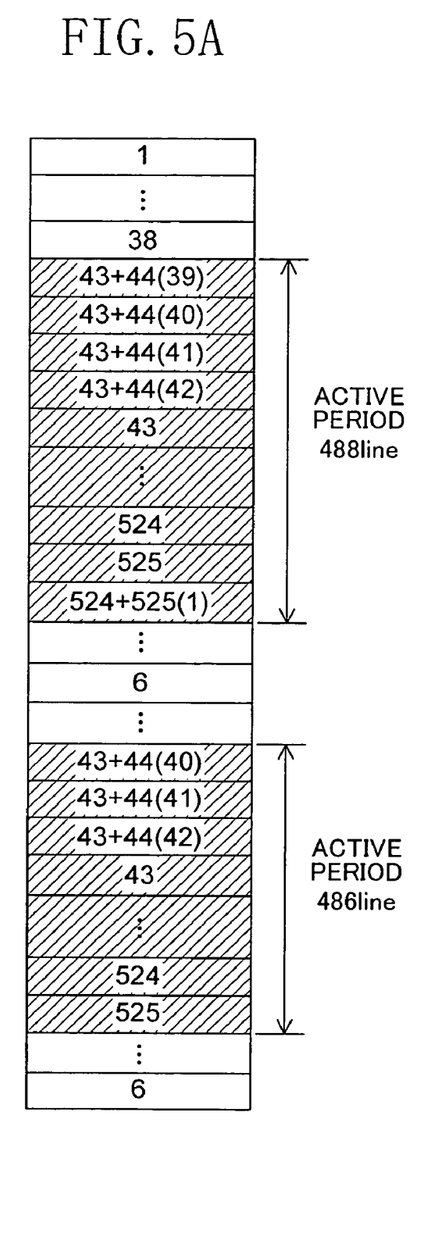
FIG. 5A shows NTSC progressive data which is converted to a digital value based on interpolated picture signal data compliant with the analog video standards in a picture signal processing circuit of embodiment 3.
Figure 5B:
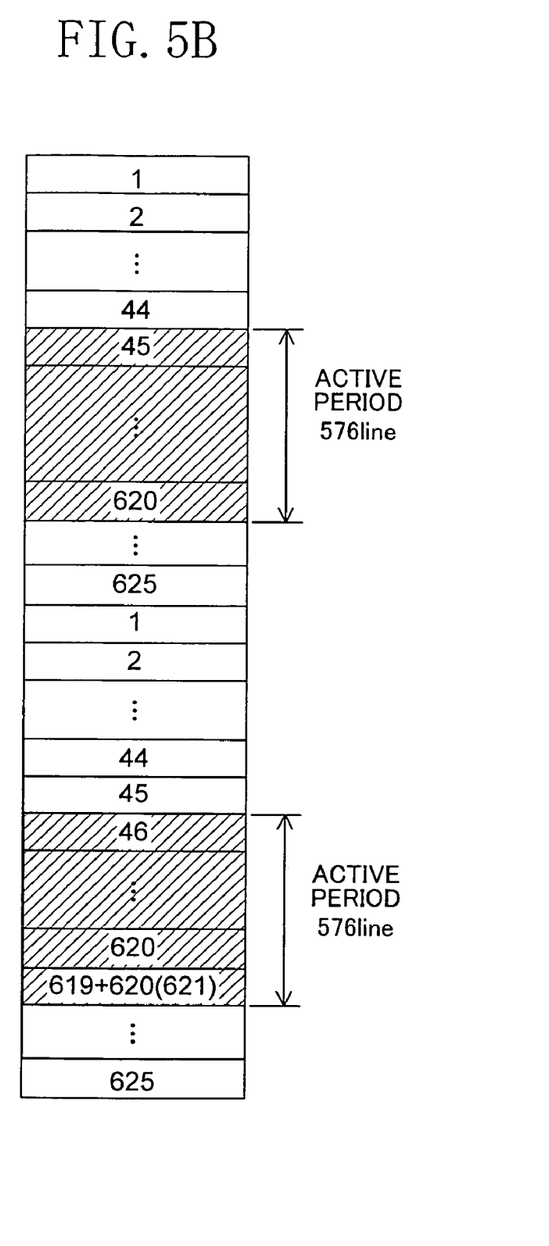
FIG. 5B shows PAL progressive data which is converted to a digital value based on interpolated picture signal data compliant with the analog video standards in the picture signal processing circuit of embodiment 3.

The video buffer memory control section 203 controls flexibly by software the output of picture signal data 301 compliant with the analog video standards from the video buffer memory 202 based on a line of the picture signal data which is processed in the digital signal processing circuit 205 and the digital and analog video formats, such that the data of a line where effective image data is not multiplexed, i.e., the data of a line which is in a picture display period in the case of the digital standards but is in a blanking period (video display blank period) in the case of the analog standards, is multiplexed based on the line counter signal 304. For example, in the case of the digital 525P standards, in the 39th to 42nd lines of the first field and the 1st line of the next field, and the 40th to 42nd lines of the second field as shown in FIG. 5A, and in the 621st line of the second field in FIG. 5B, the data of a predetermined number of lines (e.g., 2 lines) immediately after the start of the active period in the case of the analog standards (i.e., data of the 43rd and 44th lines) or the data of a predetermined number of lines (e.g., 2 lines) immediately before the end of the active period in the case of the analog standards (i.e., data of the 524th and 525th lines) are multiplexed.

On the other hand, the transfer function operation section 303 receives the picture signal data 301 from the video buffer memory 202. Now, consider a case where the data of the predetermined number of lines (e.g., 2 lines) have been multiplexed. For example, considering the 42nd line of the first field of FIG. 5A, if the digital line counter signal 304 indicates the 42nd line, the transfer function operation section 303 outputs the picture signal data 301 as the data of the 42nd line. If the data obtained by multiplexing the image data of the 43rd and 44th lines is input from the video buffer memory 202 to the transfer function operation section 303, the transfer function operation section 303 isolates the multiplexed data of the 43rd line and data of the 44th line and performs a predetermined interpolation operation (transfer function operation) using these image data to generate interpolation data. The interpolation data is output as digital picture signal data 302 of the 42nd line.

Thus, in embodiment 3, a video output compliant with the digital progressive standards is provided while image data of separately-provided lines is produced with higher accuracy. The accuracy of this image data is further increased by increasing the number of lines to be multiplexed.

What is claimed is:

1. A picture signal processing circuit, comprising:
a video buffer memory for storing picture signal data compliant with an analog video signal standard;
an analog signal processing section for converting the picture signal data compliant with the analog video signal standard, which is output from the video buffer memory, to an analog video format, thereby obtaining progressive data of an analog value;
a digital signal processing section for converting the picture signal data compliant with the analog video signal standard, which is output from the video buffer memory, to a digital video format, thereby obtaining progressive data of a digital value; and
a video buffer memory control section for controlling the output of the picture signal data compliant with the analog video signal standard from the video buffer memory such that the picture signal data compliant with the analog video signal standard from the video buffer memory is interpolated so as to output an effective picture signal data and not output any black data from the digital processing section during an active period defined by a digital video format according to the type of a digital video format in the digital signal processing section.

2. A picture signal processing circuit, comprising:
a video buffer memory for storing picture signal data compliant with an analog video signal standard;
an analog signal processing section for converting the picture signal data compliant with the analog video signal standard, which is output from the video buffer memory, to an analog video format, thereby obtaining progressive data of an analog value;
a digital signal processing section for converting the picture signal data compliant with the analog video signal standard, which is output from the video buffer memory, to a digital video format, thereby obtaining progressive data of a digital value; and
a video buffer memory control section for controlling the output of the picture signal data compliant with the analog video signal standard from the video buffer memory such that the picture signal data compliant with the analog video signal standard from the video buffer memory is interpolated according to the type of a digital video format in the digital signal processing section; wherein:
the analog signal processing section generates an analog picture display period signal while the digital signal processing section generates a digital picture display period signal; and
the video buffer memory control section controls the output of the picture signal data compliant with the analog video signal standard from the video buffer memory by hardware according to the analog picture display period signal from the analog signal processing section and the digital picture display period signal from the digital signal processing section.

3. A picture signal processing circuit, comprising:
a video buffer memory for storing picture signal data compliant with an analog video signal standard;
an analog signal processing section for converting the picture signal data compliant with the analog video signal standard, which is output from the video buffer memory, to an analog video format, thereby obtaining progressive data of an analog value;
a digital signal processing section for converting the picture signal data compliant with the analog video signal standard, which is output from the video buffer memory, to a digital video format, thereby obtaining progressive data of a digital value; and
a video buffer memory control section for controlling the output of the picture signal data compliant with the analog video signal standard from the video buffer memory such that the picture signal data compliant with the analog video signal standard from the video buffer memory is interpolated according to the type of a digital video format in the digital signal processing section;
wherein the video buffer memory control section controls the output of the picture signal data compliant with the analog video signal standard from the video buffer memory by software according to a currently processed line of digital picture signal data in the digital signal processing section, the digital video format in the digital signal processing section, and the analog video format in the analog signal processing section.

4. A picture signal processing circuit, comprising:
a video buffer memory for storing picture signal data compliant with an analog video signal standard;
an analog signal processing section for converting the picture signal data compliant with the analog video signal standard, which is output from the video buffer memory, to an analog video format, thereby obtaining progressive data of an analog value;
a digital signal processing section for converting the picture signal data compliant with the analog video signal standard, which is output from the video buffer memory, to a digital video format, thereby obtaining progressive data of a digital value; and a video buffer memory control section for controlling the output of the picture signal data compliant with the analog video signal standard from the video buffer memory such that the picture signal data compliant with the analog video signal standard from the video buffer memory is interpolated according to the type of a digital video format in the digital signal processing section;

wherein if the picture signal data compliant with the analog video signal standard which is output from the video buffer memory is within a video display blank period on the analog video format of the analog signal processing section but is within a picture display period on the digital video format of the digital signal processing section, the video buffer memory control section interpolates data in the picture display period on the digital video format using data which is the same as picture signal data compliant with an analog video signal standard which is stored in the video buffer memory.

5. The picture signal processing circuit of claim 4, wherein the video buffer memory control section interpolates data in the picture display period on the digital video format using data which is the same as a portion of the picture signal data compliant with the analog video signal standard which is stored in the video buffer memory, the portion of the picture signal data being obtained immediately after the start of the picture display period on the analog video format.

6. The picture signal processing circuit of claim 4, wherein the video buffer memory control section interpolates data in the picture display period on the digital video format using data which is the same as a portion of the picture signal data compliant with the analog video signal standard which is stored in the video buffer memory, the portion of the picture signal data being obtained immediately before the start of the video display blank period on the analog video format.

7. The picture signal processing circuit of claim 4, wherein if a picture display period on the digital video format is not identical with a video display blank period on the analog video format such that the picture display period is displaced to the upper side of the picture signal data compliant with the analog video signal standard, the video buffer memory control section shifts picture signal data compliant with the analog video signal standard in the video buffer memory toward the upper side by a predetermined number of lines and interpolates data in the picture display period on the digital video format uniformly among the upper side and the lower side of the data using the upwardly-shifted picture signal data compliant with the analog video signal standard.

8. The picture signal processing circuit of claim 7, wherein the video buffer memory control section interpolates data in the picture display period on the digital video format using a portion of the picture signal data compliant with the analog video signal standard which has been shifted toward the upper side in the video buffer memory, the portion being the same as picture signal data compliant with the analog video signal standard which is obtained immediately after the start of a picture display period on the analog video format.

9. The picture signal processing circuit of claim 7, wherein the video buffer memory control section interpolates data in the picture display period on the digital video format using a portion of the picture signal data compliant with the analog video signal standard which has been shifted toward the upper side in the video buffer memory, the portion being the same as picture signal data compliant with the analog video signal standard which is obtained immediately before the start of a video display blank period on the analog video format.

10. A picture signal processing circuit, comprising:

a video buffer memory for storing picture signal data compliant with an analog video signal standard;

an analog signal processing section for converting the picture signal data compliant with the analog video signal standard, which is output from the video buffer memory, to an analog video format, thereby obtaining progressive data of an analog value;

a digital signal processing section for converting the picture signal data compliant with the analog video signal standard, which is output from the video buffer memory, to a digital video format, thereby obtaining progressive data of a digital value; and a video buffer memory control section for controlling the output of the picture signal data compliant with the analog video signal standard from the video buffer memory such that the picture signal data compliant with the analog video signal standard from the video buffer memory is interpolated according to the type of a digital video format in the digital signal processing section; wherein:

the analog signal processing section receives picture signal data compliant with the analog video signal standard which has been output from the video buffer memory and interpolated by the video buffer memory control section; and the analog signal processing section has an output adjustment function of masking the received picture signal data compliant with the analog video signal standard during a video display blank period on the analog video format.

11. A picture signal processing circuit, comprising:

a video buffer memory for storing picture signal data compliant with an analog video signal standard;

an analog signal processing section for converting the picture signal data compliant with the analog video signal standard, which is output from the video buffer memory, to an analog video format, thereby obtaining progressive data of an analog value;

a digital signal processing section for converting the picture signal data compliant with the analog video signal standard, which is output from the video buffer memory, to a digital video format, thereby obtaining progressive data of a digital value; and a video buffer memory control section for controlling the output of the picture signal data compliant with the analog video signal standard from the video buffer memory such that the picture signal data compliant with the analog video signal standard from the video buffer memory is interpolated according to the type of a digital video format in the digital signal processing section; wherein:

the analog signal processing section receives picture signal data compliant with the analog video signal standard which has been output from the video buffer memory but not interpolated by the video buffer memory control section; and the digital signal processing section receives picture signal data compliant with the analog video signal standard which has been output from the video buffer memory and interpolated by the video buffer memory control section.

12. A picture signal processing circuit, comprising:
a video buffer memory for storing picture signal data compliant with an analog video signal standard;
an analog signal processing section for converting the picture signal data compliant with the analog video signal standard, which is output from the video buffer memory, to an analog video format, thereby obtaining progressive data of an analog value;
a digital signal processing section for converting the picture signal data compliant with the analog video signal standard, which is output from the video buffer memory, to a digital video format, thereby obtaining progressive data of a digital value; and
a video buffer memory control section for controlling the output of the picture signal data compliant with the analog video signal standard from the video buffer memory such that the picture signal data compliant with the analog video signal standard from the video buffer memory is interpolated according to the type of a digital video format in the digital signal processing section; wherein:
the video buffer memory control section controls output of data from the video buffer memory such that a portion of the interpolated picture signal data compliant with the analog video signal standard which corresponds to a plurality of predetermined lines is simultaneously output;
the picture signal processing circuit further comprises a transfer function operation circuit; and
the transfer function operation circuit receives the portion of the picture signal data compliant with the analog video signal standard which corresponds to the plurality of lines and is output from the video buffer memory, and performs a predetermined interpolation operation on the portion of the picture signal data compliant with the analog video signal standard which corresponds to the plurality of lines, the picture signal data compliant with the analog video signal standard which has undergone the interpolation operation being output to the digital signal processing section.

13. The picture signal processing circuit of claim 12, wherein the video buffer memory control section simultaneously outputs a portion of the picture signal data compliant with the analog video signal standard in the video buffer memory which corresponds to a plurality of predetermined lines immediately after the start of a picture display period on the analog video format.

14. The picture signal processing circuit of claim 12, wherein the video buffer memory control section simultaneously outputs a portion of the picture signal data compliant with the analog video signal standard in the video buffer memory which corresponds to a plurality of predetermined lines immediately before the start of a video display blank period on the analog video format.

* * * * *